Figure 1A:
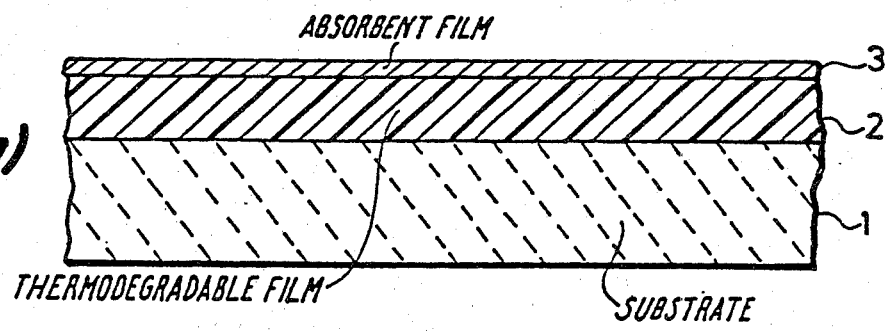

United States Patent [19]
Bricot et al.

[11] 4,405,862
[45] Sep. 20, 1983

[54] THERMOSENSITIVE DATA-CARRIER DESIGNED FOR THE RECORDING OF INFORMATION AND A METHOD OF RECORDING INFORMATION ON SUCH A DATA-CARRIER

[75] Inventors: Claude Bricot; Jean-Claude Dubois; Francois LeCarvennec; Jean-Claude Lehureau; Henriette Magna, all of Paris, France

[73] Assignee: Thomson-Brandt, Paris, France

[21] Appl. No.: 326,025

[22] Filed: Nov. 30, 1981

Related U.S. Application Data

[60] Continuation of Ser. No. 31,873, Apr. 20, 1979, abandoned, which is a division of Ser. No. 843,508, Oct. 18, 1977, Pat. No. 4,176,277.

[30] Foreign Application Priority Data

Oct. 22, 1976 [FR] France ................ 76 31867

[51] Int. Cl.³ ................................ G03C 5/16
[52] U.S. Cl. .................... 250/318; 250/317.1
[58] Field of Search ............... 250/316.1, 317.1, 318; 430/348, 49

[56] References Cited

U.S. PATENT DOCUMENTS

| Re. 24,554 | 10/1958 | Clark | 430/348 |
| 2,813,043 | 11/1957 | Clark | 250/317.1 |
| 3,219,819 | 11/1965 | Brewster | 250/317.1 |
| 3,241,996 | 3/1966 | Haas | 250/318 |
| 3,476,937 | 11/1969 | Vrancken | 250/316.1 |
| 3,558,881 | 1/1971 | Gold | 430/348 |
| 3,645,204 | 2/1972 | Gosnell | 430/438 |
| 3,732,418 | 5/1973 | Lind | 430/49 |
| 4,199,615 | 4/1980 | Wacks | 250/316.1 |
| 4,211,838 | 7/1980 | Izu et al. | 250/316.1 |

Primary Examiner—Bruce C. Anderson
Attorney, Agent, or Firm—Cushman, Darby & Cushman

[57] ABSTRACT

The present invention relates to data-carrier intended for the high-density recording of information by the use of an etching radiation beam. The data-carrier comprises a substrate upon which there are deposited a very thin film which is absorbent at the wavelength of the etching beam, and a film which is thermodegradable at a temperature lower than the degradation temperature of the absorbent film, the heat developed in the absorbent film being selectively diffused towards the adjacent thermodegradable film.

14 Claims, 8 Drawing Figures

THERMOSENSITIVE DATA-CARRIER DESIGNED FOR THE RECORDING OF INFORMATION AND A METHOD OF RECORDING INFORMATION ON SUCH A DATA-CARRIER

This is a continuation of application Ser. No. 31,873, filed Apr. 20, 1979, now abandoned, said Ser. No. 31,873 being a division of Ser. No. 843,508, filed Oct. 18, 1977, issued on Nov. 27, 1979 as U.S. Pat. No. 4,176,277.

The present invention relates to data-carriers capable of being recorded by means of a radiation beam through conversion of the energy carried by the beam into thermal energy.

Thermo-etching makes it possible to record data on data-carriers which are other than photosensitive. This type of etching generally makes it possible to produce data-carriers with very high resolution, the resolution being only limited by the size of the etching spot. The data-carriers obtained can be stored and exposed to the light without any danger, and may be read out again by a concentrated radiation beam whose intensity is lower than the intensity of the beam used to etch the data-carrier at the time of recording.

A first kind of material is used for the production of thermo-sensitive data-carriers: these are metallic materials deposited in this film form upon substrates, e.g. materials such as bismuth, cadmium or silver for example. The sensitivity of these materials is generally low and the intensity of the etching beam and hence the power of the source producing it, must be high. By way of example, the temperature to be achieved in order to bring about local degradation of a bismuth layer is around 1500° C. and this requires the use of powerful, and therefore expensive, laser sources. On the other hand, films of this kind are highly absorptive at the wavelengths used for the etching operation, since the diffusion length is of the order of 100 to 150 Å units.

A second kind of materials can be used for the production of thermo-sensitive data-carriers: there are organic materials which are thermodegradable at low temperature, such for example as nitrocellulose or polymethyl-metacrylate (PMMA). Films of this kind have the advantage that they degrade at low temperature (between 100° and 150° C.) but have low absorption in the range of laser wavelengths used. To achieve adequate absorption of the radiation, it is necessary to deposit these materials in the form of a thick film of at least onne micron, the depth of penetration for an absorption of up to at least 60% of the radiation being of the order of 1 micron. Moreover, the heat capacity of films of this kind is large and the sensitivity is therefore mediocre.

The invention relates to a thermo-sensitive data-carrier comprising a substrate upon which there has been deposited a thermo-sensitive film constituted by a thin metal film and an organic film thermodegradable at low temperature.

According to the invention, there is provided a thermo-sensitive data-carrier for the recording of information by etching with a concentrated recording radiation, comprising at least a thermo-sensitive film formed by a film thermodegradable at a temperature $T_1$ and an absorbent film, in contact with the thermodegradable film, for absorbing said recording radiation, converting said radiation into heat and selectively diffusing said heat to said thermodegradable film, and said thermodegradable film raising to its degradation temperature $T_1$.

Figure 1B:
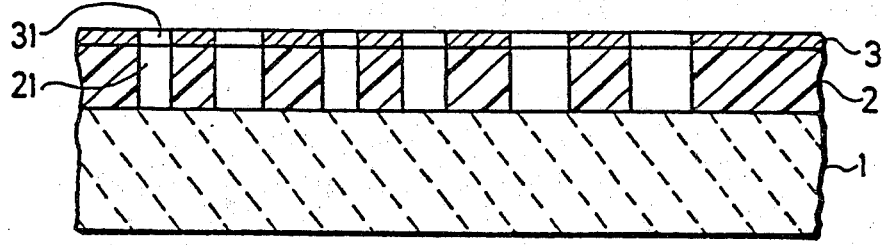

The invention will be better understood and other of its features rendered apparent from a consideration of the ensuing description given in relation to the attached drawings:

FIG. 1(a) and FIG. 1(b) illustrate the first embodiment of the thermo-sensitive data-carrier in accordance with the invention, before at FIG. 1(a) and after recording at FIG. 1(b)

Figure 2A:
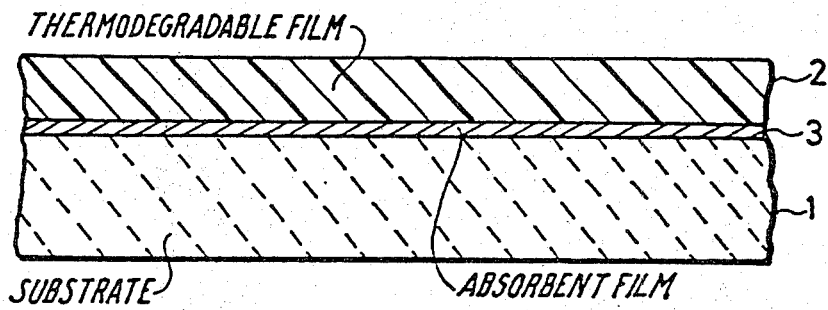
Figure 2B:
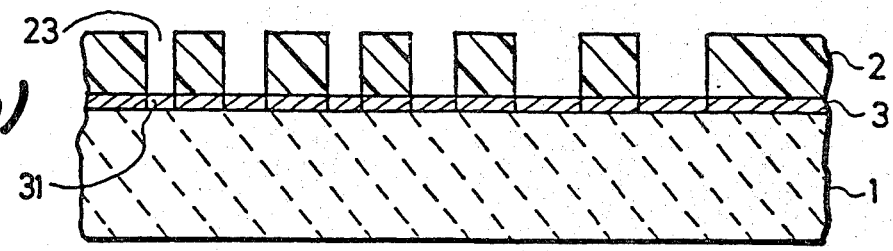
Figure 3A:
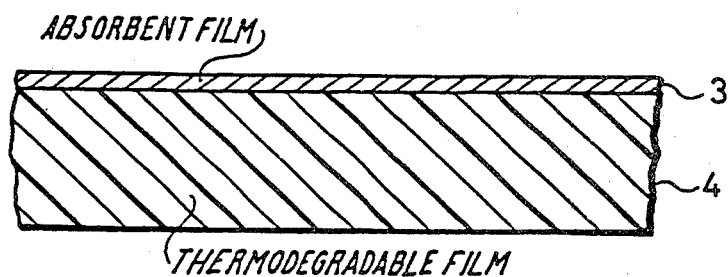
Figure 3B:
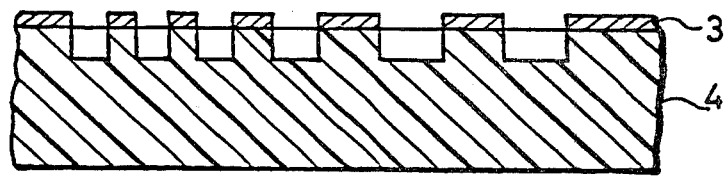
Figure 4:
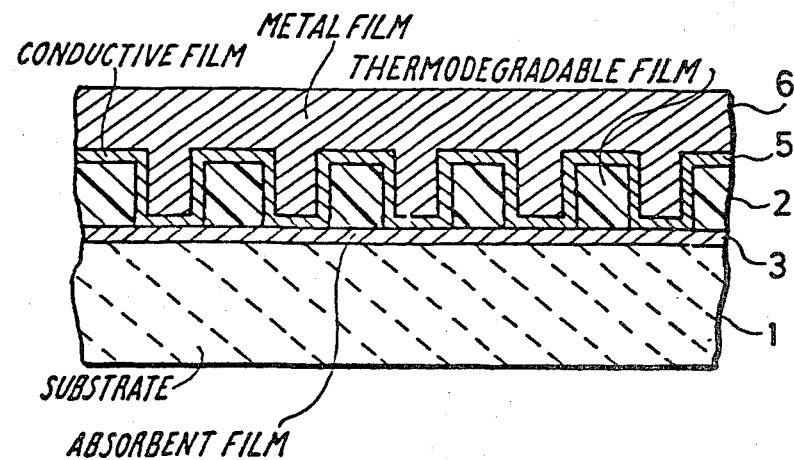

FIG. 2(a) and FIG. 2(b) illustrate a second embodiment of the thermo-sensitive data-carrier in accordance with the invention, FIG. 2(a) and FIG. 2(b) respectively representing the data-carrier prior to and after recording;

FIG. 3(a) and FIG. 3(b) illustrate a third embodiment of the data-carrier in accordance with the invention prior to recording; at FIG. 3(a) and after recoding at FIG. 3(b);

FIG. 4 illustrates the method of manufacture of a die designed for pressing of data-carriers from a data-carrier in accordance with the invention.

In FIG. 1(a), a thermo-sensitive data-carrier in accordance with the invention has been shown. It comprises a substrate I having low thermal diffusion, this substrate being formed for example from glass which is transparent to a radiation if, after etching of the data-carrier, it is desired to read information across the substrate, or of polyethyeneterephtalate for example. It also comprises a thermo-sensitive film constituted by a first film 2 of relatively small thickness, in the order of one tenth of a micron, thermodegradable at low temperature (between 100° and 150° C.) (this film may be constituted for example by nitrocellulose or PMMA) and a second film 3 of very small thickness, of the order of one hundredth of a micron, constituted by a metal or semimetal; this second film should be highly absorbent at the wavelength of the read-out radiation, this radiation coming from a laser type source which is the only one capable, when the radiation it produces is concentrated, of furnishing a spot of sufficiently small size to record microelements. Thus as, would be implicit to one skilled in the art, particularly from the discussion of the etching technique below, second film 3 contains none of the information to be recorded prior to etching. The thickness of the metal film deposited is chosen in such a fashion that the major part of the incident radiation is absorbed; a small thickness is only required since the depth of penetration of the radiation is small, and at one hundredth of a micron the film absorbs more than 60% of the radiation with such a small thickness, the thermal energy created in the metal by the light vibrations, is not diffused very widely at the surface and remains concentrated in the neighbourhood of the point of impact of the radiation; the calorific capacity per unit area, in order to raise this film to a given temperature, is therefore low.

For etching (i.e., deforming thermodegradable layer 2 as a result of heat energy generated by incident radiation), the data-carrier thus constituted is subjected to an incident etching radiation at the metal face 3. This etching radiation is almost completely absorbed by the metal film and the result is that local heating of the film occurs, this heating being limited to the immediate neighbourhood of the point of impact of the radiation. Temperatures of the order of 100° C. to 200° C. can be very rapidly reached because of the high absorptivity of the metal and its low calorific capacity. This heat is transmitted towards the underlying zone of the thermodegradable layer 2 which, as indicated earlier, is low temperature degradable, (in the neighbourhood of 150° C.). This film is therefore locally degraded; this degradation may take the form of a microscopic explosion which mechanically attacks the metal film in the zone which has diffused the heat, or of a chemical decomposition, the decomposition product chemically reacting with the metal film, again within the same from which the heat diffused. This latter chemical degradation may be brought about the nitrous products, for example nitrocellulose, which, after decomposition, will liberate gases such as $NO_3$, $NO_2$ or $O_2$ capable of combining with the metal. The metal film then undergoes modification and the data carrier thus obtained is readable by detection of the variations in amplitude of the radiation reflected by the metal film. The thus etched data-carrier has been shown in FIG. 1b) where are shown, in the film 2, zones such as 21 which have undergone thermal degradation by the heat transmitted to them from the zone 31 of the layer 3, where the etching radiation arrives, the zone 31 then being attacked either mechanically or chemically following the degradation of the underlying zones 21. Because of the large calorific capacity of the film 2, the zones of this film which are not directly in contact with the exposed zones of the metal film, undergo no degradation.

FIG. 2(a) illustrates the second embodiment of the data-carrier in accordance with the invention. As before, the carrier comprises a substrate 1 covered by a thermo-sensitive film, the latter film being constituted in the same way, by a first thermodegradable film 2 of relatively small thickness (of the order of one tenth of a micron) and a second very thin metal film (of the order of one hundredth of a micron). However, by contrast with the first embodiment, the substrate 1 is no longer in contact with the thermodegradable film 2 but instead with the metal film 3. For etching, the data carrier thus treated is subjected to an incident etching radiation which strikes the organic material film 2. This film haing a thickness in the order of a tenth of a micron (ten times less than the depth of penetration of the radiation at an attenuation of 1/e, only a very small part of the radiation is absorbed by the organic film, this absorption being quite insufficient to heat the film and raise it locally to its degradation temperature. A very large part of the incident radiation is therefore transmitted to the metal film which, because of its thickness and its absorption characteristics, absorbs the major part of the radiation and heats up locally and rapidly to reach temperatures of between 100° and 200° C.; this heat is diffused, not towards the substrate which is arranged to have low heat transfer, but towards the thermodegradable film 2 which for that reason is raised to its degradation temperature by thermal diffusion; the metal film remains intact because it is far from having reached its degradation temperature. The film 2 is locally destroyed in the zones 23 in contact with the heated metal zone such as 31, in the manner shown in FIG. 2b).

FIG. 3(a) illustrates a third embodiment of the thermo-sensitive data-carrier in accordance with the invention, etching of this kind of data-carrier being performed in the same way that was adopted for the data carrier described in reference to FIG. 1.

This data-carrier comprises a film 4 of large thickness, thermodegradable at low temperature which performs the function of the substrate 1 and of the thermodegradable film 2 in the data-carrier shown in FIG. 1. On this thermodegradable film there is deposited a very thin film of metal or semimetal. The etching radiation strikes the film 3, is largely absorbed by said film and converted into heat which is communicated to the underlying zones of the film 4 so that these latter zones are raised to the degradation temperature. The degradation of these zones brings about the degradation of the adjacent zones of the film 3 by chemical or mechanical effect. The data-carrier obtained after etching (FIG. 3(b) then comprises a film in which holes have been formed whose succession along a track, constitutes the transcription of the recording information. Thus, as would be implicit to one skilled in the art, the etching radiation transmits the information to be recorded. None of this information is contained on film 3 prior to etching.

The thermo-sensitive data-carriers designed for information recording, which have been described hereinbefore, are such that they can be etched by laser-type radiation of a low power compared with the power levels of those used hitherto for thermal etching. By way of example, in order to etch a data-carrier of disc from whose linear transfer speed opposite the etching spot, is fifteen meters per second, a point of mean length 0.7 microns can be etched by a laser beam having a power of less than 10 milliwatts at the level of the film, this corresponding to an exposure time of around 50 nanoseconds with a 10 milliwatts radiation. Powers of this level are of the order of magnitude of those obtained from semiconductor-type laser sources. This considerably reduces the cost of the etching operation in relation to that of the kind of similar operation performed using gas lasers for example.

The power required at the level of the film for the thermal etching of a bismuth film alone having a thickness of two hundredths of a micron deposited upon a glass substrate, is of the order of 40 milliwatts while in the case of a polyethyleneterephthalate substrate it is of the order of 20 milliwatts.

In the same fashion, an organic film of 1 micron in thickness deposited upon a glass or polyethyleneterephthalate substrate, requires a power in the order of 20 milliwatts to etch it.

In contrast, a double film according to the invention made up of a film of bismuth, two hundredths of a micron in thickness and an organic film one tenth of a micron in thickness deposited upon a glass substrate, only requires an etching power in the order of 4 milliwatts and, if it is deposited on a substrate formed by polyethyleneterephthalate, requires an etching power of only around 2.5 milliwatts. Again of between 5 and 10 is achieved in terms of the power required, in relation to conventional thermo-sensitive data-carriers above mentioned.

Within the context of the embodiments of the thermo-sensitive data-carrier in accordance with the invention, as shown in FIGS. 1(a), 1(b), 2(a) and 2(b), it is possible to adjust the thickness of the thermodegradable film 2 so that it acts as an anti reflex film vis-a-vis the read-out beam when the data-carrier of FIGS. 1(a) and 1(b) is read-out across the substrate and when the data-carrier of FIGS. 2(a) and 2(b) read-out across the thermodegradable film. In other words, if e is the thickness of the film, $\lambda$ the wavelength of the read-out radiation and n the refractive index of this film, the phase difference between the radiation reflected on the one hand by the first face of the film 2 reached by the radiation, and on the other hand by the second, emergent face of the data-carrier, is $2 \cdot ne$ when $e = \lambda/4n$, so that the emergent radiations will be in antiphase and will cause extinction at the output, the radiation remaining inside the data-carrier.

The invention is not limited to the specific embodiments described hereinbefore. In particular, in order to form the substrate, other materials may be used provided that they have low heat transfer coefficients and good mechanical strength. The thermo-sensitive film itself, provided it is formed by a film which is thermodegradable at low temperature (it can be formed with nitrous organic products) and by a highly absorbent film, is in accordance with the invention.

The thickness of the etched film (in the order of 0.1 micron) is compatible with the read-out devices in which the phase difference between the radiation passing through an etched zone is chosen to be around $\lambda/2$, where $\lambda$ is the wavelength of the read-out radiation.

This kind of thermo-sensitive data-carrier has the advantage that it can be recorded and read-out immediately since there is no developing operation, and consequently real-time monitoring of etching can be performed.

Moreover, a data-carrier of this kind, after recording, is directly compatible with the manufacture of a die intended for reproduction of the impression by a pressing operation.

In other words, as FIG. 4 shows, a recorded data-carrier of the kind shown in FIG. 2b) comprising a substrate 1 and a thermo-sensitive film constituted by an absorbent film 3 and a thermodegradable film 2 which is partially degraded, is covered by a conductive film 5. This film may be a silver or gold film, for example. In a general way, it is chosen to form an electrode and permit the deposition of a metal film 6 by a plating technique. This film may be constituted by nickel. The die thus created by the film 6 constitutes a "negative" of the information and can be used to produce data-carriers by pressing operations.

What we claim is:

1. A thermosensitive data-carrier for storing information recorded with a concentrated beam of radiation forming an etching spot on said data-carrier, said recorded information being solely generated by causing said etching spot to strike said data carrier at a plurality of points of impact, said data carrier consisting of:
   a substrate;
   a thermosensitive film of a material which liberates gases by thermal decomposition at a degradation temperature $T_1$, said thermosensitive film being uniformly affixed to said substrate; and
   a further film of material, said further film not carrying any of said information prior to any decomposition of said thermosensitive film as a result of heat generated by said radiation and extending over said substrate prior to said decomposition for absorbing radiation of said beam, thereby converting said radiation into heat at said points of impact and selectively diffusing said heat into a portion of said thermosensitive film, for causing said portion to reach said degradation temperature $T_1$ and creating said decomposition in at least said thermosensitive film in the vicinity of said points of impact.

2. A thermo-sensitive data-carrier as claimed in claim 1, wherein the thermo-sensitive film is deposited upon a thermally insulating substrate.

3. A thermo-sensitive data-carrier as claimed in claim 2, wherein the absorbent film is in contact with the substrate, the etching radiation incident upon the thermosensitive film passing through said film and being absorbed to a small extent only, the major absorption of it taking place in the absorbent film.

4. A thermo-sensitive data-carrier as claimed in claim 2, wherein the thermosensitive film is in contact with the substrate, the etching radiation being incident upon the absorbent film which diffuses the heat towards the underlying zones of the thermodegradable film, decomposition of these underlying zones by the heat bringing about variations in structure in the corresponding zones of the absorbent film.

5. A thermo-sensitive data-carrier as claimed in claim 4, wherein the local variations in the structure of the absorbent film are created by chemical reaction between the decomposition parts and the constituent elements of said absorbent film.

6. A thermo-sensitive data-carrier as claimed in claim 4, wherein the local variations in the structure of the absorbent film are products by mechanical attack, the decomposition products of the thermodegradable film producing explosive mixtures.

7. A thermo-sensitive data-carrier as claimed in claim 1, wherein the thermosensitive film is constituted by nitrous organic compounds.

8. A thermo-sensitive data-carrier as claimed in claim 1, the absorbent film is a metal or semimetal film.

9. A method of storing data on a thermosensitive data carrier comprising the steps of:
   exposing said data carrier to a concentrated beam of radiation by causing said beam to strike said data carrier at a plurality of points of impact, said data being transmitted to said data carrier only by said beam and being represented by a pattern of said points of impact;
   absorbing energy from said beam at each of said points of impact in an absorptive layer of said data carrier, said absorptive layer not carrying any of said data prior to said absorbing step; and
   transferring energy from said absorptive layer to an adjacent thermosensitive film of said data carrier to raise the temperatue of said thermosensitive film directly adjacent each of said points of impact above a temperature $T_1$ at which said thermosensitive film liberates gases by thermal decomposition to deform at least said thermosensitive film at said points of impact.

10. A method of manufacturing a die for reproducing data carriers by making impressions woth said die comprising the steps of:
    recording information on a base by repeatedly subjecting said base to a concentrated beam of radiation forming a plurality of etching spots on said base, said recorded information being solely generated by causing said etching spot to strike said base at a plurality of points of impact, said base comprising a thermosensitive film of a material which liberates gases by thermal decomposition at a degradation temperature $T_1$ and a further film of material, said further film not carrying any of said information prior to any decomposition of said thermosensitive film as a result of heat generated by said radiation and extending over said thermosensitive film prior to said decomposition for absorbing radiation of said beam, thereby converting said radiation into heat in the points of impact of said concentrated recording radiation and selectively diffusing said heat into a portion of said thermosensitive film, for causing said portion to reach said degradation temperature $T_1$ and creating said decomposition in at least said thermosensitive film in the vicinity of said points of impact of said concentrated recording radiation;

disposing die material over said base so that a surface of said die assumes the contours of a surface of said base; and removing said base.

11. A method of manufacturing a die for reproducing data carriers by making impressions with said die comprising the steps of:

exposing a base to a concentrated beam of radiation by causing said beam to strike said base at a plurality of points of impact, said data being transmitted to said base only by said beam and being represented by a pattern of said points of impact;

absorbing energy from said beam at each of said points of impact in an absorptive layer of said base, said absorptive layer not carrying any of said data prior to said absorbing step;

transferring energy from said absorptive layer to an adjacent thermosensitive film of a material which liberates gases by thermal decomposition at a temperature $T_1$ to raise the temperature of said thermosensitive film directly adjacent each of said points of impact above said temperature $T_1$ at which said thermosensitive film decomposes to deform at least said thermosensitive film at said points of impact, said base including said thermosensitive film;

disposing die material over said base so that a surface of said die assumes the contours of a surface of said base; and removing said base.

12. A method as in claim 10 or 11 wherein said disposing step comprises the steps of:

disposing a thin conductive film on said base so that opposite surfaces of said conductive film conform to the contours of said data carrier; and plating die material on said conductive film.

13. A method as in claim 12 wherein said conductive film is of the group consisting of silver and gold.

14. A method as in claim 12 wherein said die material is nickel.

* * * * *